(12) United States Patent
Greulich et al.

(10) Patent No.: US 7,806,018 B2
(45) Date of Patent: Oct. 5, 2010

(54) GEAR MECHANISM UNIT FOR A MOTOR VEHICLE ACTUATING DRIVE

(75) Inventors: Jürgen Greulich, Würzburg (DE); Margit Henig, Rottendorf (DE); Peter Klingler, Neubrunn (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 12/089,832

(22) PCT Filed: Sep. 6, 2006

(86) PCT No.: PCT/EP2006/066071

§ 371 (c)(1),
(2), (4) Date: Apr. 10, 2008

(87) PCT Pub. No.: WO2007/042357

PCT Pub. Date: Apr. 19, 2007

(65) Prior Publication Data

US 2008/0223164 A1   Sep. 18, 2008

(30) Foreign Application Priority Data

Oct. 12, 2005   (DE) .................. 10 2005 048 888

(51) Int. Cl.
*F16H 1/16* (2006.01)
(52) U.S. Cl. ...................................... 74/425
(58) Field of Classification Search .............. 74/411, 74/425, 606 R; 384/283, 291; 310/89
See application file for complete search history.

(56) References Cited

U.S. PATENT DOCUMENTS

| | | | | | |
|---|---|---|---|---|---|
| 4,748,862 | A | * | 6/1988 | Johnston | 74/7 R |
| 5,259,261 | A | * | 11/1993 | Michel | 74/425 |
| 5,325,736 | A | * | 7/1994 | Tsujita | 74/425 |
| 5,452,622 | A | * | 9/1995 | Fenelon | 74/411 |
| 5,653,144 | A | * | 8/1997 | Fenelon | 74/411 |
| 5,836,219 | A | | 11/1998 | Klingler et al. | 74/606 |
| 6,003,397 | A | * | 12/1999 | Yasuhira | 74/425 |
| 6,043,616 | A | | 3/2000 | Redelberger | 318/9 |
| 6,452,296 | B1 | | 9/2002 | Torii et al. | 310/75 |

(Continued)

FOREIGN PATENT DOCUMENTS

DE   35 19 056 A1   12/1986

(Continued)

OTHER PUBLICATIONS http://www.rtpcompany.com/info/data/long/VLF80105CC.htm.*

(Continued)

*Primary Examiner*—Thomas R Hannon
*Assistant Examiner*—Phillip A Johnson
(74) *Attorney, Agent, or Firm*—Westman, Champlin & Kelly, P.A.

(57) ABSTRACT

A gear mechanism unit for a motor vehicle actuating drive has a gear mechanism housing (1), an axle (2) which is fixedly connected to the gear mechanism housing, and a worm gear (5). The worm gear is provided at its outer periphery with a toothing (6). The axle, in its axial region which is provided for mounting the worm gear, has a region (2a) which is of larger diameter than its other axial regions (2e).

12 Claims, 2 Drawing Sheets

U.S. PATENT DOCUMENTS

| | | | |
|---|---|---|---|
| 6,789,912 B2 * | 9/2004 | Smith | 362/35 |
| 7,045,202 B2 * | 5/2006 | Tanaka et al. | 428/297.4 |
| 2002/0020239 A1 * | 2/2002 | Adachi et al. | 74/425 |
| 2002/0047379 A1 * | 4/2002 | Torii et al. | 310/89 |
| 2005/0039571 A1 * | 2/2005 | Takabayashi et al. | 74/606 R |
| 2005/0067521 A1 | 3/2005 | Klippert | 242/390.8 |

FOREIGN PATENT DOCUMENTS

| | | |
|---|---|---|
| DE | 88 12 399.5 U1 | 7/1989 |
| DE | 93 11 529.6 U1 | 10/1993 |
| DE | 295 13 701 U1 | 10/1996 |
| DE | 295 15 515 U1 | 12/1996 |
| DE | 101 15 446 A1 | 12/2001 |
| DE | 103 42 074 A1 | 4/2005 |

OTHER PUBLICATIONS http://www.plastic-products.com/part12.htm.*

* cited by examiner

US 7,806,018 B2

GEAR MECHANISM UNIT FOR A MOTOR VEHICLE ACTUATING DRIVE

CROSS-REFERENCE TO RELATED APPLICATIONS

This application is a U.S. national stage application of International Application No. PCT/EP2006/066071 filed Sep. 6, 2006, which designates the United States of America, and claims priority to German application number 10 2005 048 888.9 filed Oct. 12, 2005, the contents of which are hereby incorporated by reference in their entirety.

TECHNICAL FIELD

The invention relates to a gear mechanism unit for a motor vehicle actuating drive.

BACKGROUND

Gear mechanism units for a motor vehicle actuating drive are already known. They have a gear mechanism housing, an axle that is fixedly connected to said gear mechanism housing and a worm gear that is mounted on said axle in such a way that it can be rotated. The worm gear is provided at its outer periphery with toothing that meshes with a worm shaft, the latter being driven by a motor shaft or forming a unit with the motor shaft.

Gear mechanism units of this type are used in conjunction with window lift drives for example. The gear mechanism housing of known gear mechanism units often consists of PBT, i.e. a plastic with a 30% proportion of short glass fibers. The axle that is connected to the gear mechanism housing consists in many cases of steel in order to prevent the axle from deforming during operation due to toothing forces.

A window lift drive unit that is intended particularly for a cable window lift is known from DE 35 19 056 C2. This known drive unit has a housing in which are provided a worm gear that is driven by a drive motor and an output member that is displaced by the worm gear. Furthermore, a bearing pin that is mounted on one of the wall parts of the housing is provided for the worm gear. The bearing pin is positioned in a bearing bush that is riveted to the wall part. The output member or the worm gear is mounted on the outer peripheral surface of the bearing bush. Furthermore, the known drive unit is provided with a securing device which prevents the output member or worm gear from being pulled away from the bearing bushing.

Furthermore, a window lift drive is known from DE 88 12 399 U1. This has a gear mechanism housing in which a worm gear is mounted in such a way that it can be rotated on an axle that is fixedly connected to the gear mechanism housing, said worm gear being driven by an electric drive motor. Furthermore, the worm gear is arranged such that it is rotationally engaged with an output member by means of protruding driving cams in order to bring about the up-and-down movement of a window by means of a driving plate that is coaxially and also rotatably mounted on the axle. Furthermore, a driving plate is provided that has on its front face which faces away from the worm gear an axially protruding shaft collar that encircles the axle concentrically. Said shaft collar has an external lattice structure for positive rotational engagement both with a pulley of a cable window lift and with drive pinion of an arm-type or scissor-type window lift. The pulley or the drive pinion is provided with an internal lattice structure that corresponds to the external lattice structure of the shaft collar. These measures are intended to reduce component costs for cable window lifts and arm-type or scissor-type window lifts with a simple design that is suitable for automated production.

Furthermore, a motor gear mechanism drive unit that can be used in particular as a motor vehicle window lift drive is known from DE 295 13 701 U1. This known unit has a gear mechanism housing which has a support for a worm gear axle, on which a worm gear can be mounted.

SUMMARY

A new gear mechanism unit can be provided which does not cause the axle that is connected to the gear mechanism housing to deform during operation despite the occurrence of high toothing forces.

According to an embodiment, a gear mechanism unit for motor vehicle actuating drive, may comprise a gear mechanism housing, an axle that is fixedly connected to the gear mechanism housing, and a worm gear that is provided with toothing at its outer periphery, wherein the axle has an axial area that is provided for mounting the worm gear which has an enlarged diameter in comparison to its other axial areas.

According to a further embodiment, the axle may be provided in its enlarged diameter area with an outer ring, an inner ring and radially oriented stabilizing ribs connecting the outer ring with the inner ring. According to a further embodiment, the gear mechanism housing and the axle may be formed from a single-piece molded plastic part and are made from the same plastic material, and the plastic material may exhibit a high tensile modulus. According to a further embodiment, the plastic material may be polypropylene with long glass fiber reinforcement. According to a further embodiment, the plastic material may be PET. According to a further embodiment, the bearing surface of the worm gear may be provided with facets. According to a further embodiment, the inner ring may act as a bearing surface for a sealing ring. According to a further embodiment, the mounted worm gear may be axially secured by means of a mounted gear mechanism cover.

BRIEF DESCRIPTION OF THE DRAWINGS

Further advantageous characteristics of the invention are exemplified with reference to the figures, in which.

DETAILED DESCRIPTION

The advantages of a gear mechanism unit according to various embodiments are that, due to the increase in the diameter of the axle in the axial area of the toothing, the surface pressure that occurs during operation is distributed over a larger area and is thus reduced. This prevents deformations of the axle from occurring.

The ribbing according to a further embodiment further stabilizes the gear mechanism unit comprising the gear mechanism housing, the axle and the worm gear.

If the gear mechanism housing and the axle according to a further embodiment are realized in the form of a single-piece molded plastic part made from a plastic material with a high tensile modulus, then the use of a steel axle can be avoided. This simplifies the manufacturing process, as it is not necessary to insert or take account of a steel axle during the injection molding process. A further advantage according to various embodiments is that the weight of the gear mechanism housing is reduced considerably.

If polypropylene with long glass fiber reinforcement is used as the plastic material with a high tensile modulus, according to a further embodiment, material costs to the extent of approximately 20% can be saved, as polypropylene with long glass fiber reinforcement exhibits a density of approximately 20% less with comparable mechanical properties and material price per kilogram.

The worm gear may be preferably arranged so that it is facetted in its contact area with the axle. This has the advantage of better producibility and improved lubrication during operation.

The inner ring provided in the enlarged diameter area of the axle acts in an advantageous way as a bearing surface for a sealing ring. In comparison to known gear mechanism units, this has the advantage that a securing element and a washer for axially securing the sealing ring may not be required.

A gear mechanism unit according to various embodiments is intended for use in a motor vehicle actuating drive, for example a window lift drive. It has a gear mechanism housing, an axle that is fixedly connected to the gear mechanism housing, a worm gear that is provided with toothing at its outer periphery, and a gear mechanism cover.

Figure 1:
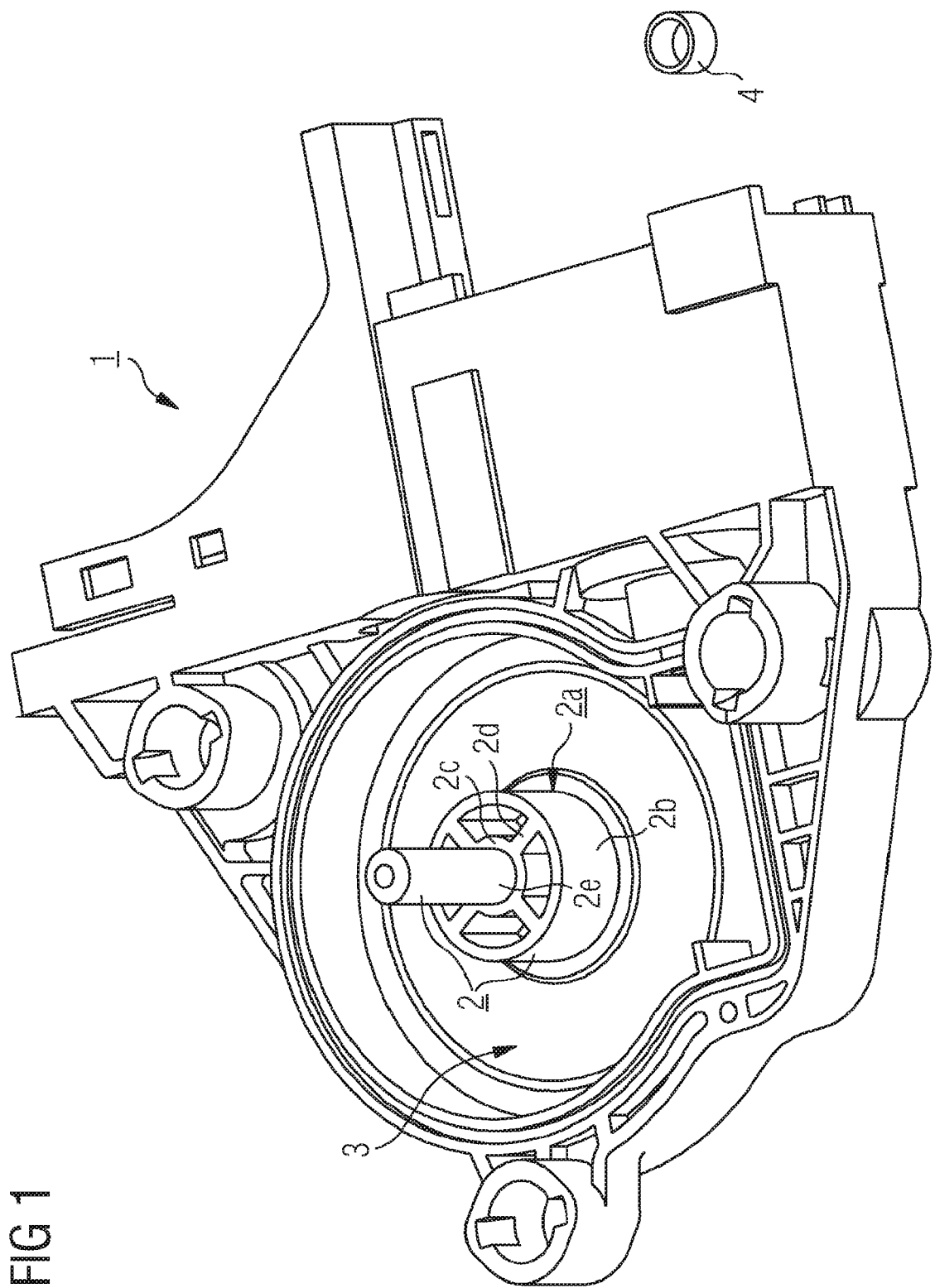
FIG. 1 shows an exemplary embodiment of the gear mechanism housing of a gear mechanism unit.

FIG. 1 shows an exemplary embodiment of the gear mechanism housing of a gear mechanism unit. The gear mechanism housing 1 portrayed is a single-piece molded plastic part manufactured using an injection molding process. Part of this molded plastic part includes the axle 2, on which the worm gear is placed when the gear mechanism unit is assembled. In order to accommodate the worm gear, which is shown in FIG. 2, the gear mechanism housing 1 has a recess 3.

Furthermore, the axle 2, in its axial area which is provided for mounting the worm gear, has a greater diameter than in its other axial areas. This enlarged diameter area of axle 2 is indicated in FIG. 1 with reference numeral 2a. The enlarged diameter area 2a has an outer ring 2b, an inner ring 2c and radially oriented stabilizing ribs 2d connecting the outer ring to the inner ring. The inner ring 2c acts as a bearing surface for a sealing ring 4, which is shown at the bottom right of FIG. 1.

Figure 2:
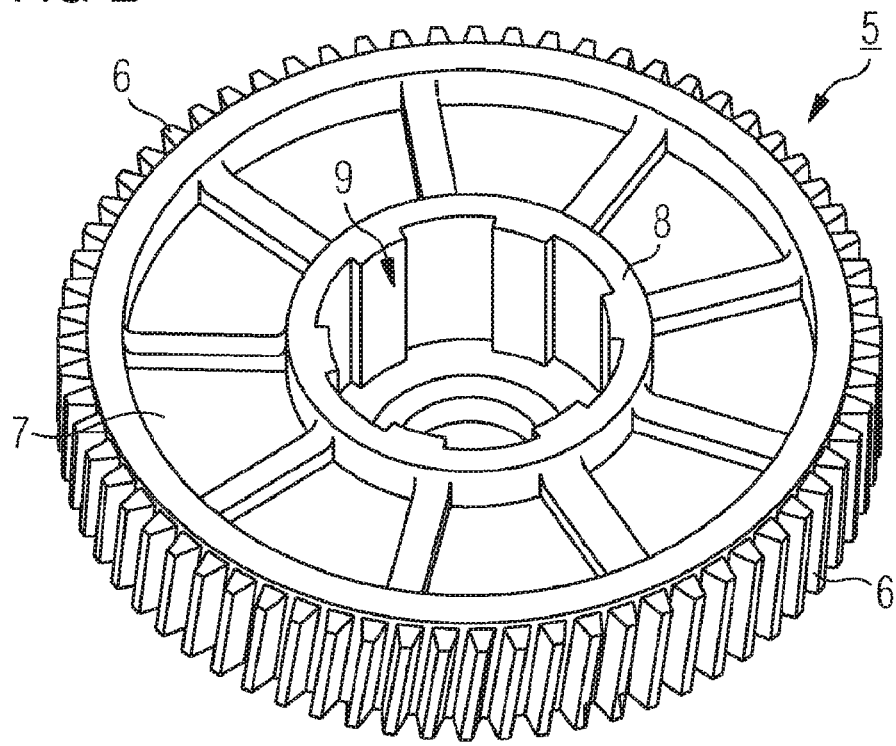
FIG. 2 shows an exemplary embodiment of a worm gear that can be employed in the gear mechanism housing according to FIG. 1.

FIG. 2 shows an exemplary embodiment of a worm gear 5 which is inserted into the recess 3 of the gear mechanism housing 1 when the gear mechanism unit is assembled. The worm gear 5 has toothing 6 at its outer periphery. This toothing 6 meshes with a worm shaft during operation, which for its part is driven by a motor shaft or forms a unit with the motor shaft. The toothing 6 is connected to an inner worm gear ring 8 by means of a worm gear body 7 which also has radially oriented ribs. The inner surface of this inner worm gear ring 8 acts as a bearing area and comes into contact with the outer surface of the outer ring 2b of the enlarged diameter area 2a of the axle 2 when the worm gear 5 is inserted into the gear mechanism housing 1.

The inner surface 9 of the inner worm gear ring 8, i.e. the bearing surface of the worm gear 5, is preferably facetted. These facets 9 can be created by means of a grinding process or as part of the injection molding process. The advantages of a facetted arrangement of this type is that the worm gear can be more easily manufactured, as there is no need for a highly accurate round internal surface, and that lubrication of the bearing area is improved during operation of the gear mechanism unit.

The worm gear shown in FIG. 2 is a single-piece component made from polyacetal (POM), or a substance with similar properties, that can be manufactured as part of an injection molding process.

The advantage of a gear mechanism housing that has an axle with a larger diameter in the axial area of the worm gear is that the toothing forces that act on the axle when the gear mechanism unit is in operation do not cause deformations in the axle. This ensures that the meshing between the external toothing of the worm gear and the worm shaft is guaranteed, even when the gear mechanism unit has been operated for several years.

This advantage can be enhanced in that the gear mechanism housing 1, which is a single-piece molded plastic part, is made from a plastic material that exhibits a high tensile modulus. The tensile modulus is preferably in the range greater than 9,000 megapascal. Polypropylene with long glass fiber reinforcement is preferably used according to an embodiment. This has a density of approximately 20% less than PBT with 30% short glass fiber with comparable mechanical properties and the same material price per kilogram.

Figure 3:
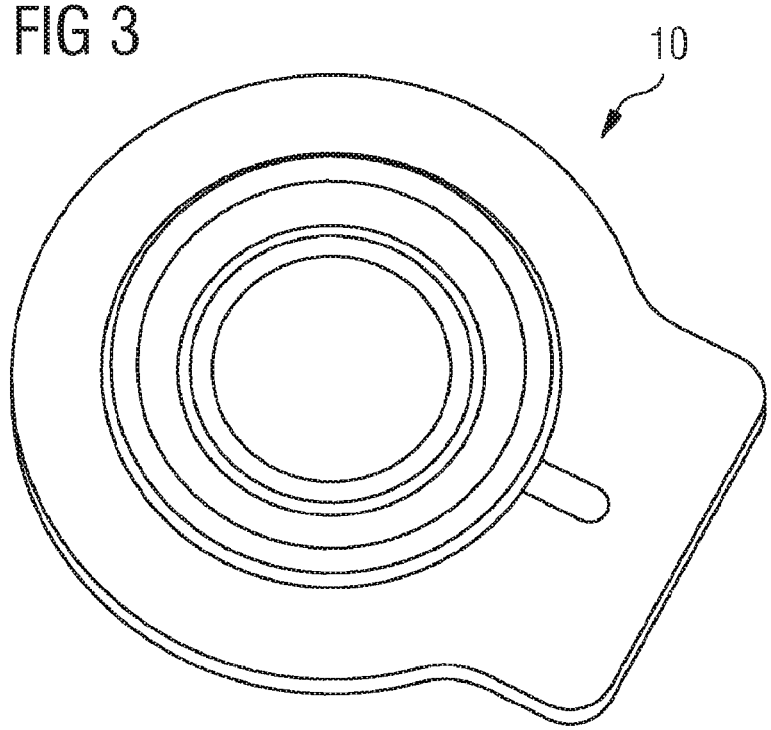
FIG. 3 shows a gear mechanism cover.

According to various embodiments, a weight reduction can be achieved compared to known gear mechanism housings with a steel axle. Furthermore, there is no requirement for a securing element and a washer for axially securing the sealing ring, because the worm gear can be axially secured by means of a gear mechanism cover 10 that is placed on top. An example of a gear mechanism cover 10 of this type is shown in FIG. 3.

This gear mechanism cover has a projection running around the edge that fits into an appropriate groove in the gear mechanism housing and is clamped there.

The diameter of the axle 2 in its axial area 2e, which is situated above the area with the enlarged diameter 2a in FIG. 1, is preferably dimensioned so that it corresponds to the diameter of known axles. This has the advantage that the customer interface on the output side need not be changed in comparison to known gear mechanism units.

What is claimed is:

1. A gear mechanism unit for motor vehicle actuating drive, the gear mechanism unit comprising:
   a gear mechanism housing,
   an axle that is fixedly connected to the gear mechanism housing, and
   a worm gear that is provided with toothing at its outer periphery,
   wherein the axle has an axial area which is provided for mounting the worm gear and which has an enlarged diameter in comparison to the other axial areas of the axle,
   wherein the axle is provided in this enlarged diameter area provided for mounting the worm gear with an outer ring, an inner ring, and radially oriented stabilizing ribs connecting the outer ring to the inner ring, and
   wherein the gear mechanism housing and the axle are formed from a single-piece molded plastic part and are made from the same plastic material, and the plastic material exhibits a high tensile modulus.

2. The gear mechanism unit according to claim 1, wherein the plastic material is polypropylene with long glass fiber reinforcement.

3. The gear mechanism unit according to claim 1, wherein the plastic material is polyethylene terphthalate.

4. The gear mechanism unit according to claim 1, wherein the bearing surface of the worm gear is provided with facets.

5. The gear mechanism unit according to claim 1, wherein the inner ring acts as a bearing surface for a sealing ring.

6. The gear mechanism unit according to claim 1, wherein the mounted worm gear is axially secured by means of a mounted gear mechanism cover.

7. A method for manufacturing a gear mechanism unit for motor vehicle actuating drive, the method comprising the steps of:

providing a gear mechanism housing, fixedly connecting an axle to the gear mechanism housing, and providing a worm gear with toothing at its outer periphery, wherein the axle has an axial area which is provided for mounting the worm gear and which has an enlarged diameter in comparison to the other axial areas of the axle, wherein the axle is provided in this enlarged diameter area provided for mounting the worm gear with an outer ring, an inner ring, and radially oriented stabilizing ribs connecting the outer ring with the inner ring, and wherein the gear mechanism housing and the axle are formed from a single-piece molded plastic part and are made from the same plastic material, and the plastic material exhibits a high tensile modulus.

8. The method according to claim 7 wherein the plastic material is polypropylene with long glass fiber reinforcement.

9. The method according to claim 7, wherein the plastic material is polyethylene terphthalate.

10. The method according to claim 7, wherein the bearing surface of the worm gear is provided with facets.

11. The method according to claim 7, wherein the inner ring acts as a bearing surface for a sealing ring.

12. The method according to claim 7, wherein the mounted worm gear is axially secured by means of a mounted gear mechanism cover.

* * * * *